(12) United States Patent
Weston (10) Patent No.: US 8,421,916 B2
(45) Date of Patent: Apr. 16, 2013

(54) IMAGE PROCESSING

(75) Inventor: Martin Weston, Hampshire (GB)

(73) Assignee: Snell Limited, Hampshire (GB)

( * ) Notice: Subject to any disclaimer, the term of this patent is extended or adjusted under 35 U.S.C. 154(b) by 756 days.

(21) Appl. No.: 11/795,248

(22) PCT Filed: Jan. 16, 2006

(86) PCT No.: PCT/GB2006/000130
§ 371 (c)(1),
(2), (4) Date: Nov. 21, 2008

(87) PCT Pub. No.: WO2006/075178
PCT Pub. Date: Jul. 20, 2006

(65) Prior Publication Data
US 2009/0102967 A1 Apr. 23, 2009

(30) Foreign Application Priority Data

Jan. 14, 2005 (GB) .................................. 0500805.7

(51) Int. Cl.
H04N 7/01 (2006.01)
H04N 11/20 (2006.01)
G06K 9/40 (2006.01)

(52) U.S. Cl.
USPC ............................ 348/448; 348/449; 382/260

(58) Field of Classification Search .................. 348/448, 348/449, 451, 452; 382/266, 298, 300
See application file for complete search history.

(56) References Cited

U.S. PATENT DOCUMENTS 5,019,903 A * 5/1991 Dougall et al. ............... 348/448
5,093,721 A * 3/1992 Rabii ............................ 348/448
5,124,794 A   6/1992 Rabii
5,444,493 A   8/1995 Boie
5,621,467 A * 4/1997 Chien et al. .............. 375/240.15
5,774,601 A * 6/1998 Mahmoodi ................... 382/298
5,875,040 A * 2/1999 Matraszek et al. ............ 358/453
5,886,745 A * 3/1999 Muraji et al. ................. 348/448
6,262,773 B1 * 7/2001 Westerman .................... 348/448

(Continued)

FOREIGN PATENT DOCUMENTS

EP   0361558   4/1990
EP   0536717   4/1993

(Continued)

OTHER PUBLICATIONS

Office Action for European Patent Application No. 06700687.4 dated Mar. 28, 2011.

(Continued)

*Primary Examiner* — Brian Yenke
(74) *Attorney, Agent, or Firm* — Pearl Cohen Zedek Latzer, LLP (57) ABSTRACT

The present invention relates to methods and apparatus for interpolation of images, and in a particular example to de-interlacing of video signals using spatial interpolation. The present invention discloses a method for measuring the slope of a picture portion in which picture gradients are calculated from said selected pixel values and the slope measurement being derived from said gradient values. The invention also discloses a method of spatial interpolation of an array of pixel values, in which interpolated values are dependent upon the measurement of the slope associated with said array. Non-integer slopes can easily be accommodated with the method of the invention.

3 Claims, 8 Drawing Sheets

U.S. PATENT DOCUMENTS

| | | | | |
|---|---|---|---|---|
| 6,345,106 B1* | 2/2002 | Borer | ............................ | 382/107 |
| 6,408,109 B1* | 6/2002 | Silver et al. | .................... | 382/300 |
| 6,611,260 B1 | 8/2003 | Greenberg et al. | | |
| 6,618,508 B1* | 9/2003 | Webb et al. | .................... | 382/238 |
| 6,630,961 B1* | 10/2003 | Shin et al. | ..................... | 348/448 |
| 6,657,677 B1* | 12/2003 | He et al. | ........................ | 348/625 |
| 6,690,842 B1* | 2/2004 | Silver et al. | .................... | 382/300 |
| 6,731,342 B2* | 5/2004 | Shin et al. | ..................... | 348/452 |
| 6,731,821 B1* | 5/2004 | Maurer et al. | ................. | 382/263 |
| 6,832,009 B1* | 12/2004 | Shezaf et al. | ................. | 382/300 |
| 6,862,368 B1* | 3/2005 | He et al. | ........................ | 382/199 |
| 6,950,560 B2* | 9/2005 | Weston | ........................ | 382/261 |
| 6,965,705 B1* | 11/2005 | Ma et al. | ........................ | 382/300 |
| 7,126,643 B2* | 10/2006 | Song et al. | ..................... | 348/448 |
| 7,190,406 B2* | 3/2007 | Ji et al. | ........................... | 348/448 |
| 7,202,908 B2* | 4/2007 | Zhou et al. | .................... | 348/452 |
| 7,245,326 B2* | 7/2007 | Orlick | ........................... | 348/448 |
| 7,349,028 B2* | 3/2008 | Neuman et al. | .............. | 348/448 |
| 7,362,378 B2* | 4/2008 | Orlick | ........................... | 348/452 |
| 7,379,626 B2* | 5/2008 | Lachine et al. | ............... | 382/300 |
| 7,412,096 B2* | 8/2008 | Neuman et al. | .............. | 382/199 |
| 7,423,691 B2* | 9/2008 | Orlick et al. | ................... | 348/448 |
| 7,519,232 B2* | 4/2009 | Neuman et al. | .............. | 382/266 |
| 7,548,663 B2* | 6/2009 | Chao | ............................ | 382/300 |
| 7,633,549 B2* | 12/2009 | Swan | ............................ | 348/448 |
| 7,830,449 B2* | 11/2010 | Zhou et al. | .................... | 348/452 |
| 7,880,809 B2* | 2/2011 | Neuman et al. | .............. | 348/448 |
| 7,893,994 B2* | 2/2011 | Gambhire | ..................... | 348/458 |
| 7,945,121 B2* | 5/2011 | Wei et al. | ..................... | 382/300 |
| 7,982,798 B2* | 7/2011 | Adams | ......................... | 348/448 |
| 2001/0008425 A1* | 7/2001 | Shin et al. | ..................... | 348/452 |
| 2002/0047932 A1* | 4/2002 | Weston | ........................ | 348/606 |
| 2002/0136446 A1* | 9/2002 | Slavin | ........................... | 382/162 |
| 2003/0123753 A1 | 7/2003 | Chow | | |
| 2004/0066467 A1 | 4/2004 | Hahn | | |
| 2004/0160529 A1 | 8/2004 | Nagakura et al. | | |
| 2004/0252232 A1 | 12/2004 | Lodder et al. | | |
| 2004/0257475 A1 | 12/2004 | Kim et al. | | |
| 2005/0073607 A1* | 4/2005 | Ji et al. | .......................... | 348/448 |
| 2005/0094899 A1* | 5/2005 | Kim et al. | ..................... | 382/300 |
| 2005/0169553 A1* | 8/2005 | Maurer | ........................ | 382/266 |
| 2007/0248164 A1* | 10/2007 | Zuo et al. | .................... | 375/240.2 |
| 2008/0055338 A1* | 3/2008 | Wei et al. | ..................... | 345/667 |
| 2008/0218630 A1* | 9/2008 | Kempf et al. | ................. | 348/452 |
| 2010/0085476 A1* | 4/2010 | Hsu | ................................ | 348/448 |
| 2010/0157147 A1* | 6/2010 | Bellers | .......................... | 348/448 |
| 2011/0002555 A1* | 1/2011 | Sodagar | ....................... | 382/266 |

FOREIGN PATENT DOCUMENTS

| | | |
|---|---|---|
| EP | 1313312 | 5/2003 |
| WO | WO 97/17801 | 5/1997 |
| WO | WO 99/56247 | 11/1999 |

OTHER PUBLICATIONS

T. Doyle et al., "Progressive Scan Conversion using Edge Information", Signal Processing of HDTV, II, Turin, Vol. Workshop 3, Aug. 30, 1989 pp. 711-721.

G. de Haan et al., "Deinterlacing—An overview," Proc. IEEE, vol. 86, No. 9, pp. 1839-1857, Sep. 1998.

International search report of PCT/GB2006/000130.

Search Report for Great Britain Application No. G80600850.2 dated Feb. 8, 2010.

* cited by examiner

IMAGE PROCESSING

CROSS-REFERENCE TO RELATED APPLICATIONS

This application is a National Phase Application of PCT International Application No. PCT/GB2006/000130, International Filing Date Jan. 16, 2006, claiming priority of British Patent Application, No. 0500805.7, filed Jan. 14, 2005.

BACKGROUND OF THE INVENTION

The present invention relates to methods and apparatus for interpolation of images, and in a particular example to de-interlacing of video signals using spatial interpolation.

In an interlaced video signal, a frame is built from two interleaved fields which correspond to two separate times, typically 1/50 or 1/60 second apart. The aim of de-interlacing is to interpolate alternate lines in each field so that a whole frame of information is available at each of the two times, making a progressive output signal.

There are several known methods of de-interlacing, as described, for example, in "De-interlacing—an overview" by G. de Haan and E. B. Bellers, Proc. IEEE, vol 86, no 9, September 1998, pp 1839-57. In one method, the missing lines in each field are simply copied from the other field in the input frame. This method gives a correct result if the input picture is static or if the two fields in the frame have been scanned from a single frame of film. However, this method produces disturbing artefacts if the input is a moving video sequence, because the interpolated lines are being displayed at the wrong time, resulting in a double image whose spacing depends on the speed of motion. These artefacts can be reduced or removed by measuring the motion of objects in the picture and compensating for the motion when interpolating using information from other fields. However, motion compensation is costly, can be unreliable, and fails to bring useful information at so-called "critical speeds" when the vertical component of the motion is an odd number of frame-lines per field period.

In cases where motion compensation fails, it is necessary to have recourse to spatial interpolation, using information from the current field. Spatial interpolation may be combined with temporal methods, either in a linear spatio-temporal filter or in an adaptive scheme involving switching between methods that make more or less use of spatial and temporal information. In lower cost systems, the use of spatial interpolation alone is an attractive option.

It is an object of the present invention to provide an improved method of spatial interpolation.

SUMMARY OF THE INVENTION

According to a first aspect of the invention, there is provided a method for measuring the slope of a picture portion; said method comprising selecting a plurality of pixels having respective pixel values and calculating picture gradients from said selected pixel values, said slope measurement being derived from said gradient values.

A second aspect of the invention provides a method for interpolating between two lines of an array of input pixels, wherein a new pixel value is interpolated along a line which does not pass through any pixels in said two lines of the array.

A further aspect of the invention provides a method of spatial interpolation of an array of pixel values, wherein a new pixel value is generated by interpolation along a line whose slope is a non-integral value of pixel spacings.

According to a still further aspect of the invention there is provided an apparatus for measuring the slope of a picture portion, comprising an input adapted to receive a plurality of input pixel values, one or more filters for deriving picture gradients from said input pixels, and a processor for combining said picture gradients to derive a slope measurement.

Another aspect of the invention provides a spatial interpolator comprising an input adapted to receive a plurality of input pixel values, a vertical filter for deriving a vertical interpolation value from said input pixels, one or more filters for deriving picture gradients from said input pixels, a processor for combining said picture gradients to derive a slope measurement associated with those input pixels, and a processor for producing a correction value dependent on said slope measurement, wherein the interpolated output is a combination of the vertical interpolation and the correction value.

Yet another aspect of the invention provides a method for interpolating between two lines of a picture in which the interpolation depends on an estimate of the slope of contours at or near the point to be interpolated, characterised in that the slope estimate depends on gradient values measured on a neighbourhood of input pixels.

BRIEF DESCRIPTION OF THE DRAWINGS

The invention will now be described by way of example with reference to the accompanying drawings in which.

DETAILED DESCRIPTION OF THE INVENTION

Figure 1:
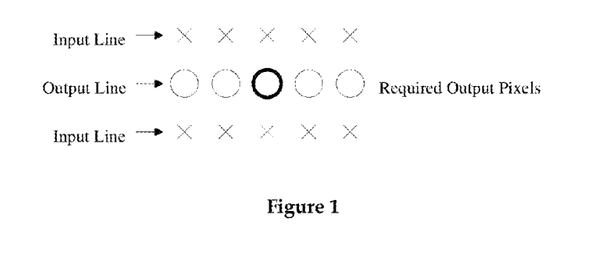
FIG. 1 illustrates the basic principle of spatial de-interlacing.

FIG. 1 illustrates the spatial de-interlacing problem. In this example, only a few pixels from adjacent lines are used, but there is in principle no limit to the size of the neighbourhood that could be used.

Errors can arise in spatial de-interlacing because the input lines are widely spaced. The vertical sampling rate is often below the Nyquist limit, unless pre-filtering is provided by the response of the camera, so there is often significant aliasing.

Figure 2:
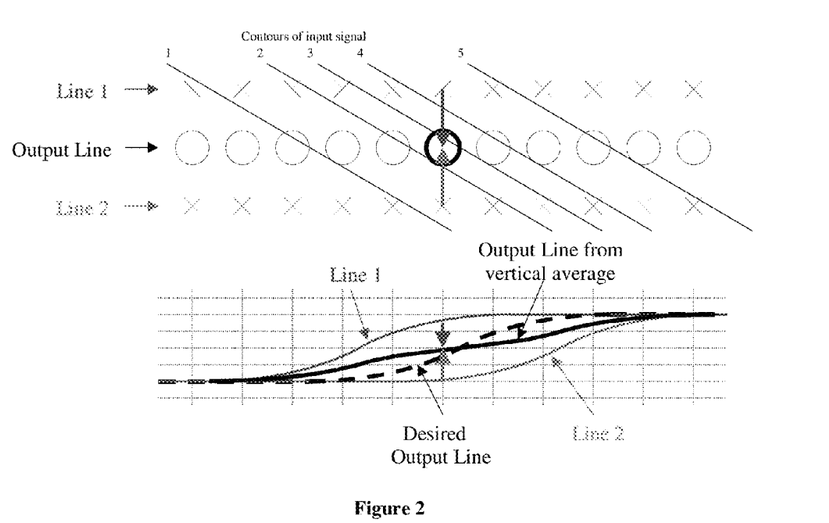
FIG. 2 illustrates vertical interpolation of an image having diagonal contours.

The simplest form of spatial de-interlacing is vertical interpolation. This works well if the contours of the picture are nearly vertical, but it gives a poor result for diagonal contours. FIG. 2 shows the desired horizontal waveform of the output line compared with the much softer transition produced by vertical interpolation, in the presence of diagonal contours having a slope of approximately 2.

By convention, a slope of x indicates that a contour passing through the current output pixel passes through a point x sample periods to the left in Line 1 and x sample periods to the right in Line 2; this convention applies equally to negative slope values. A slope may have a non-integer value.

Figure 3:
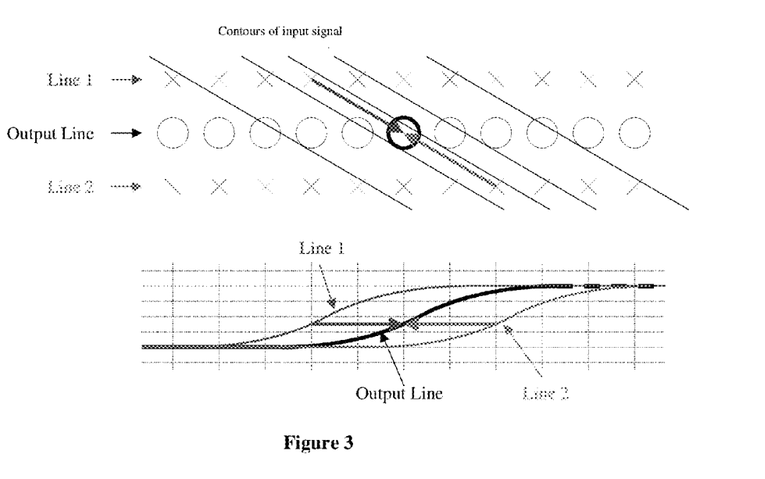
FIG. 3 illustrates the principle of diagonal interpolation.

It is apparent from FIG. 2 that the desired output transition is a horizontally shifted version of the lines above and below, as shown in FIG. 3. The aim of "diagonal de-interlacing" is to achieve this desired output transition for diagonal contours as well as for vertical ones.

In a typical prior art methods of diagonal de-interlacing, the slope is estimated by defining candidate slopes extending between pairs of pixels either side of the interpolation site, and taking the difference of these pairs of pixels. The candidate slope having a difference of minimum magnitude is selected. A simple averaging filter is then used along the slope between the pixels giving the minimum difference to produce the output pixel value. An example of this approach using seven possible slopes is shown as a block diagram in FIG. 4.

Figure 4:
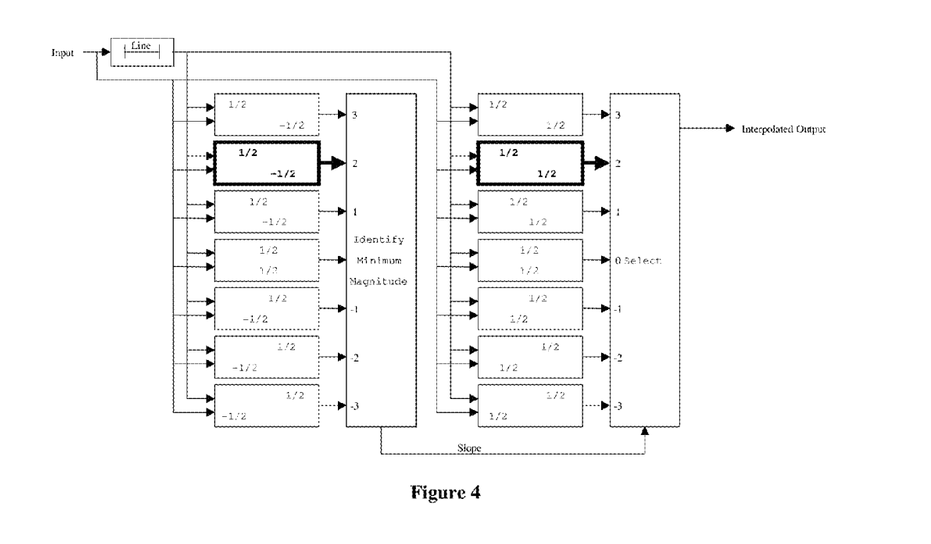
FIG. 4 is a prior art diagonal interpolator.

In FIG. 4 and elsewhere in this description, a convention is used whereby simple linear filters are represented by boxes containing numbers representing the filter coefficients in their spatial positions, relative to the centre of the box which represents the current output pixel. For example, the box outlined in bold on the left of FIG. 4 calculates half the pixel difference along a slope of 2, and the box outlined in bold on the right of the diagram calculates an average of the two input pixels along the same slope. Thus, in the left half of the diagram, pixel differences are calculated along each of the seven possible slopes with values 3, 2, 1, 0, −1, −2 and −3 and the slope with the minimum magnitude difference is selected. In the right half of the diagram, pixel averages are calculated along each of the seven slopes and the final interpolated output is selected to be one of those averages corresponding to the estimated slope.

In this approach, only integer slopes (contours that pass through input and output pixels) are detected and compensated, and the maximum slope that can be compensated depends on the number of comparators. Fine lines can confuse this method, because small differences can be obtained across the line as well as along the line. This problem can be solved by filtering the magnitudes of the differences over a region surrounding the current pixel, but this is costly because it has to be done for each comparison.

Contours with non-integer slopes also give problems, because the minimum difference could be missed by the adjacent integer slopes and given Instead by some other slope which happens to give a smaller difference.

Figure 5:
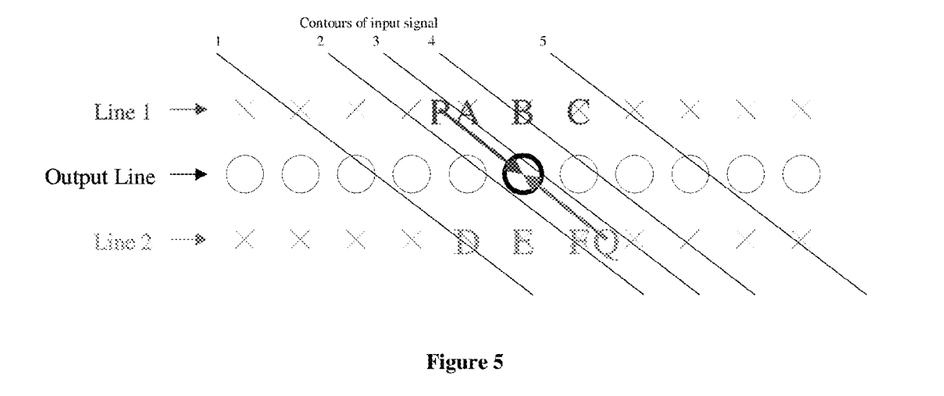
FIG. 5 illustrates pixel nomenclature.

FIG. 5 shows the labelling of pixels that will be used in the following description. The input pixels involved are A, B and C from the line above the pixel to be interpolated and D, E and F from the line below. P and Q are values that are calculated from the input pixels and which form the basis of the final interpolated value. The figure shows an example of a particular slope with a value of about 1.5.

Figure 6:
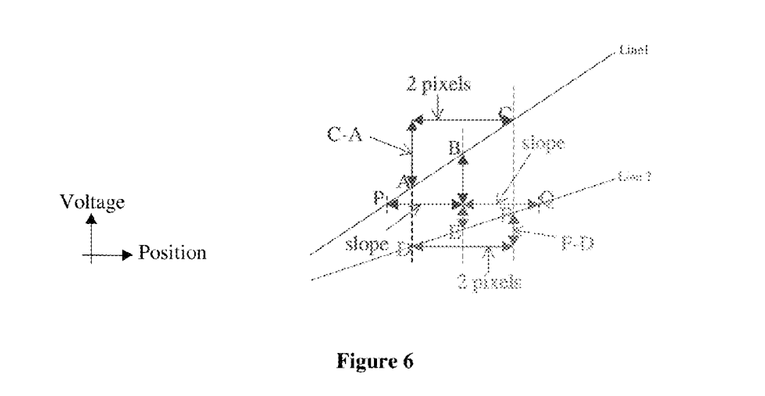
FIG. 6 illustrates gradient based interpolation.

We shall first describe a method of calculating the interpolated value given that the slope is known. The basis of the method is that the value of P is calculated using an estimate of the local gradient in Line 1 and the value of Q is calculated using an estimate of the local gradient in Line 2. FIG. 6 illustrates the calculation of these gradients.

P is calculated from A, B and C as follows:

$$P = B - (B - P)$$

But $B - P \approx \text{slope} \cdot \frac{C - A}{2}$ So $P \approx B - \text{slope} \cdot \frac{C - A}{2}$ Likewise $Q \approx E + \text{slope} \cdot \frac{F - D}{2}$ Now Output $= \frac{P + Q}{2} = \frac{B + E}{2} + \text{slope} \cdot \frac{(F - D) - (C - A)}{4}$ But $\frac{B + E}{2} = \text{Vertical Interpolation}$ And defining $Gxy = \frac{(F - D) - (C - A)}{4}$ gives Output = Vertical Interpolation + slope × $Gxy$ Thus the interpolated output is calculated by vertical interpolation with a correction based on the slope and on a two-dimensional gradient Gxy. This method is more robust to slope errors than straightforward interpolation along the diagonal because Gxy is independent of average pixel values.

Figure 7:
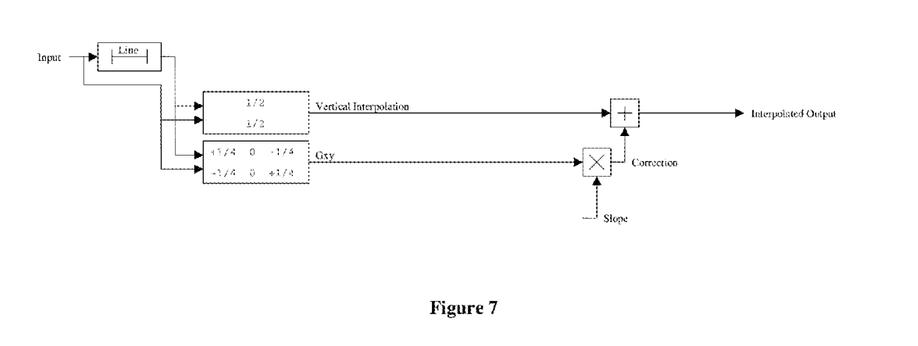
FIG. 7 is a block diagram of a gradient based interpolator.

A block diagram of this interpolator is given in FIG. 7. With the convention described above and the recognised conventions for delays, adders, subtractors and the like, this block diagram provides the skilled reader with all information necessary to construct the interpolator. This same approach will be taken with further described embodiments of the invention.

We now turn to how the slope is estimated using gradient calculations. Using FIG. 6 as a guide, we calculate the value of slope that will give P=Q:

From before: $P \approx B - \text{slope} \cdot \frac{C - A}{2}$ and $Q \approx E - \text{slope} \cdot \frac{F - D}{2}$ So $P = Q$ if $B - \text{slope} \cdot \frac{C - A}{2} = E - \text{slope} \cdot \frac{F - D}{2}$ So slope $\approx 2 \frac{B - E}{C - A + F - D}$ Defining $Gx = \frac{C - A + F - D}{4}$, $Gy = \frac{B - E}{2}$ gives slope $\approx \frac{Gy}{Gx}$ This derivation assumes that the gradients are constant. An alternative derivation is based on projecting all the input pixels onto the output line and then applying a maximally flat high pass filter to the projected pixels. The aim is to choose a slope which minimizes the output of this filter. This derivation yields the same basic formula for the slope but with a different definition of Gy:

$$Gy = \left(\frac{A}{12} + \frac{B}{3} + \frac{C}{12}\right) - \left(\frac{D}{12} + \frac{E}{3} + \frac{F}{12}\right)$$

This derivation assumes that the slope is small. An alternative definition of Gy, which has been found to work well in practice, is:

$$Gy = \left(\frac{A}{8} + \frac{B}{4} + \frac{C}{8}\right) - \left(\frac{D}{8} + \frac{E}{4} + \frac{F}{8}\right)$$

Figure 8:
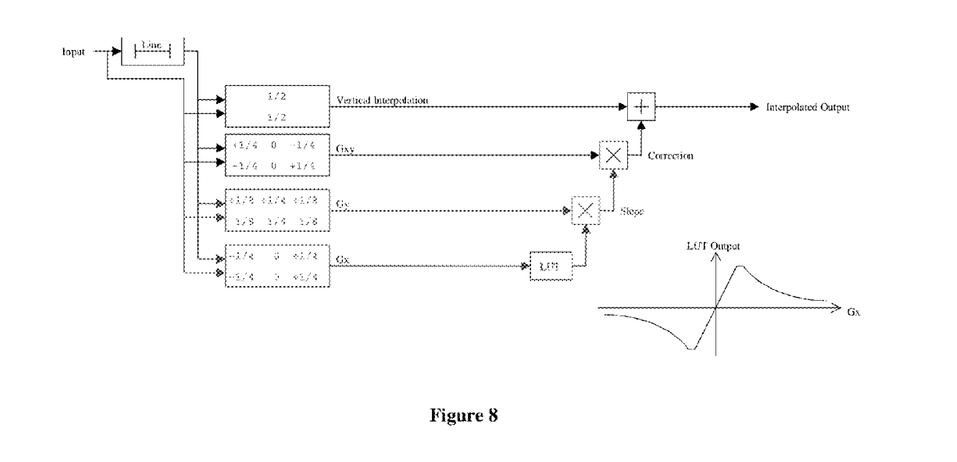
FIG. 8 is a block diagram of a gradient based estimator and interpolator according to an embodiment of one aspect of the present invention.

FIG. 8 shows how this gradient-based slope estimator is combined with a gradient-based Interpolator to give a complete system:

In FIG. 8, the quotient Gy/Gx has been replaced by a multiplier combined with a look-up table (LUT) which calculates 1/Gx with suitable treatment of small values of Gx. In particular, for small values of Gx the exemplary look-up table (LUT) uses a linear function instead of a 1/Gx function. This avoids problems associated with a division by zero.

Note that the method so far described uses only six pixels to generate an interpolation. In principle, it can deal with any slope because (as shown in FIG. 5, for example) values can be extrapolated outside the area bounded by the input pixels.

Figure 9:
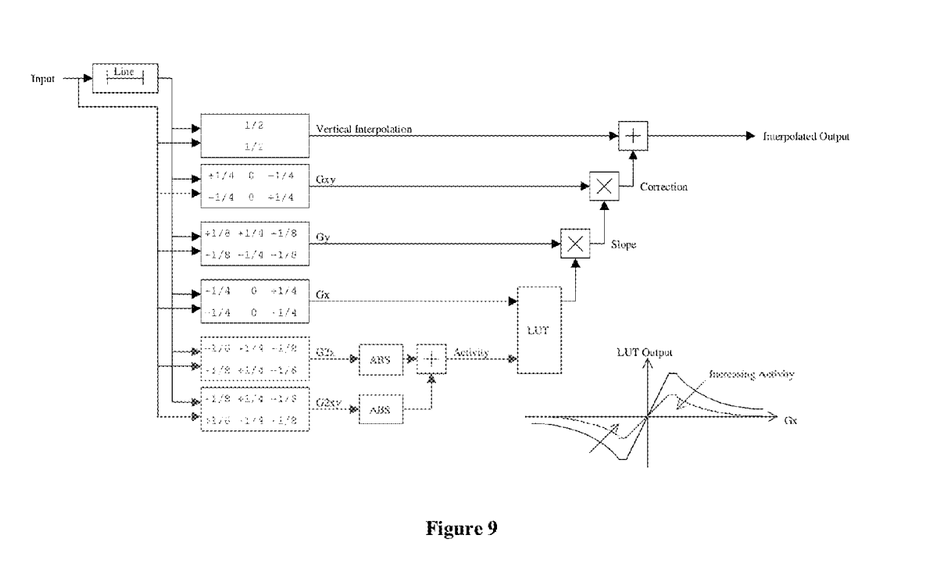
FIG. 9 is a variation of the interpolator of FIG. 8.

A refinement of the above method will now be described. It is apparent that sloping edges have low activity. It is therefore reasonable to suppose that a slope estimate may not be so reliable if the activity is high. In FIG. 9, an activity estimate has been added consisting of two components added together; a horizontal activity measure G2x and a spatial activity measure G2xy.

The horizontal activity-measure G2x represents the second horizontal difference measure and the spatial activity measure G2xy represents the vertical difference of the second horizontal difference measure. Exemplary definitions of the activity measures are:

$$G2x = \left(-\frac{A}{8} + \frac{B}{4} - \frac{C}{8}\right) + \left(-\frac{D}{8} + \frac{E}{4} - \frac{F}{8}\right)$$

$$G2xy = \left(-\frac{A}{8} + \frac{B}{4} - \frac{C}{8}\right) + \left(\frac{D}{8} - \frac{E}{4} + \frac{F}{8}\right)$$

These activity measures tend to have high values in situations where there is a high degree of activity or texture in a picture.

Clearly, the horizontal activity measure G2x and the spatial activity measure G2xy may be used either singly or in combination in forming the activity measure.

This activity measure may be explicitly divided into Gx, which would have the effect of reducing the correction value when the activity is high, or (as shown in FIG. 9) it may address a look-up table along with Gx. The contents of this look-up table may be generated by a training process using complete still frames to provide a desired reference signal known as "ground truth".

Figure 10:
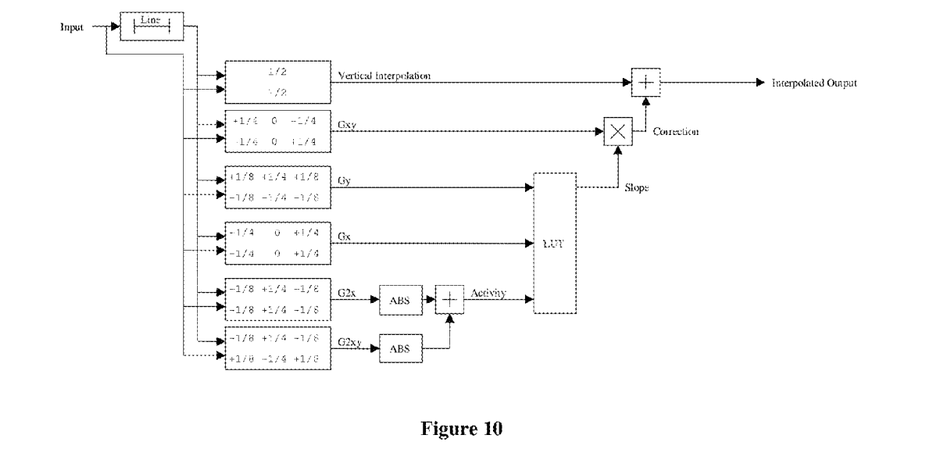
FIGS. 10 and 11 show variations of the interpolator of FIG. 9.
Figure 11:
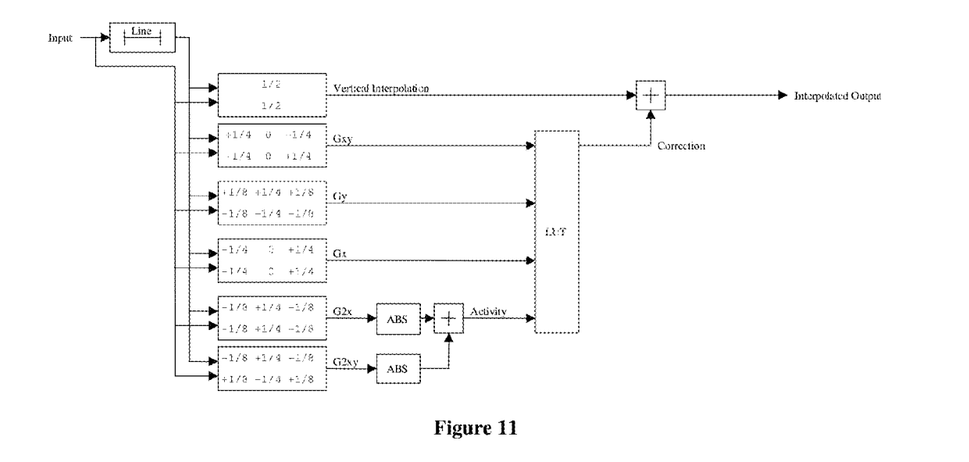

In other embodiments, the use of a look-up table to generate intermediate values may be extended to include Gy as a third input, as shown In FIG. 10, and further to include Gxy as a fourth input, as shown in FIG. 11. As before, the contents of these look-up tables may be generated by a training process, though this becomes a more laborious task, requiring more ground truth material, as the number of inputs to the look-up table is increased.

Note that in the exemplary embodiment having a four-input look-up table, the correction to vertical interpolation is calculated directly and an explicit slope value is not generated. Nevertheless, the system will still respond to different slopes in the input picture by applying different correction values.

In the remainder of this application, look-up tables shown have no more than two inputs, but it is always possible to substitute look-up tables with more inputs as previously described.

Figure 12:
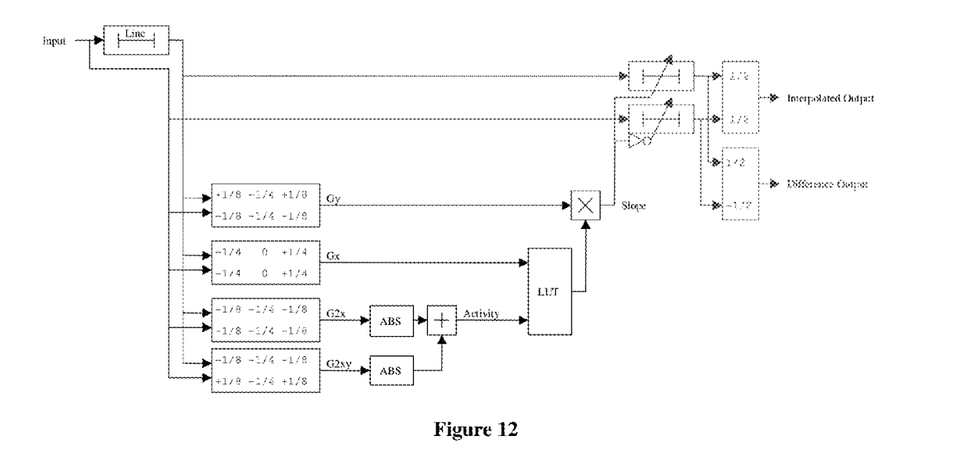
FIGS. 12 to 14 show interpolators according to an embodiment of one aspect of the present invention.

Recall that we have a method in which the slope is calculated using gradients and is then used to control a robust gradient-based interpolator. If the slope estimation is reliable, it is no longer necessary for the interpolator to be as robust and better performance may be obtained using a direct slope-compensated interpolator, which is shown in FIG. 12.

In this diagram, the delays near the output are variable sub-pixel delays controlled by the slope value. Sub-pixel samples may be obtained by interpolation using any known technique, for example linear interpolation between the two nearest input pixel values.

The diagram also shows a "difference output". This provides a measure of failure of the slope estimator, which can be useful if diagonal interpolation is being combined with other interpolation modes (for example, temporal modes) in an adaptive system.

Figure 13:
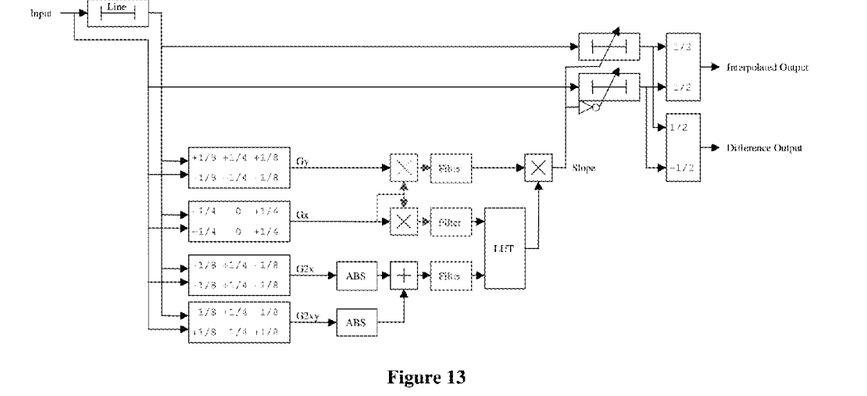

A further improvement to the slope estimator can be obtained by combining the gradient estimates over a region surrounding the current pixel, as shown in FIG. 13.

In this example, each of the gradients Gx and Gy is weighted by Gx, and applied to a filter. In addition, the activity measure formed in the exemplary embodiment by the combination of the horizontal activity measure G2x and the spatial activity measure G2xy is applied to a filter before being input to the LUT. The function of the filters is to average or smooth the input values.

The weighting of the gradients Gx and Gy by gradient Gx and subsequent filtering enhances the contribution of gradient Gx to the determination of the slope. In particular the smoothing effect of the filters allows information from positions where gradient Gx is large to be averaged with positions where gradient Gx is small or zero, thus improving the accuracy of the determination of the slope.

Thus the slope (excluding the output of the look-up table) is given by $$\text{slope} = \frac{Filt(Gy \cdot Gx)}{Filt(Gx \cdot Gx)}$$

Figure 14:
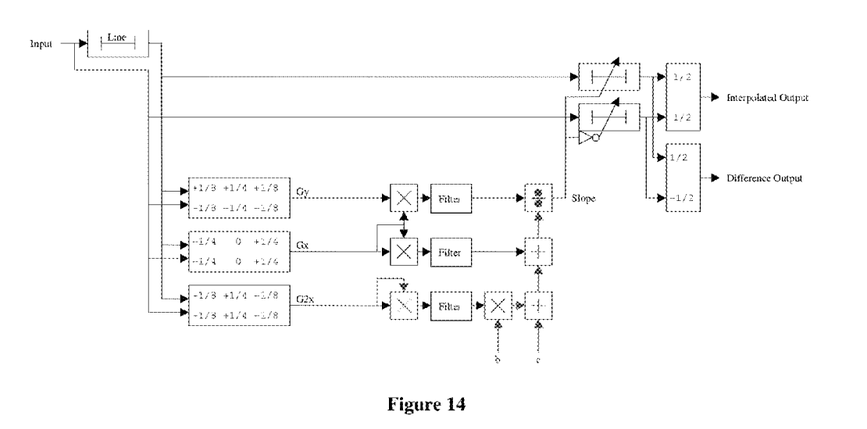

A simplified exemplary method will now be described. The simplified method is illustrated in FIG. 14.

Here, the look-up table is replaced by a weighted addition and is followed by a division. Division by zero is prevented by adding a constant c to Gx. Finally, the spatial component G2xy of the activity measure is removed since this component has the least impact on the slope calculation. Once again filter blocks for gradients Gx and Gy and for the activity measure G2x are included, and the weighting of the gradients Gx and Gy by gradient Gx and subsequent filtering enhances the contribution of gradient Gx to the determination of the slope.

A further embodiment of the method brings an improvement for very large slopes. For positive slopes (top left to bottom right) greater than 1, for example, a more reliable estimate of the slope can be obtained by "twisting" the set of input pixels, advancing Line 1 and delaying Line 2 by one or more pixels leading to the selected pixel values in line 2 being offset horizontally from the pixel values in line 1. Twisting the set of input pixel values by one pixel is shown in FIG. 15.

Figure 15:
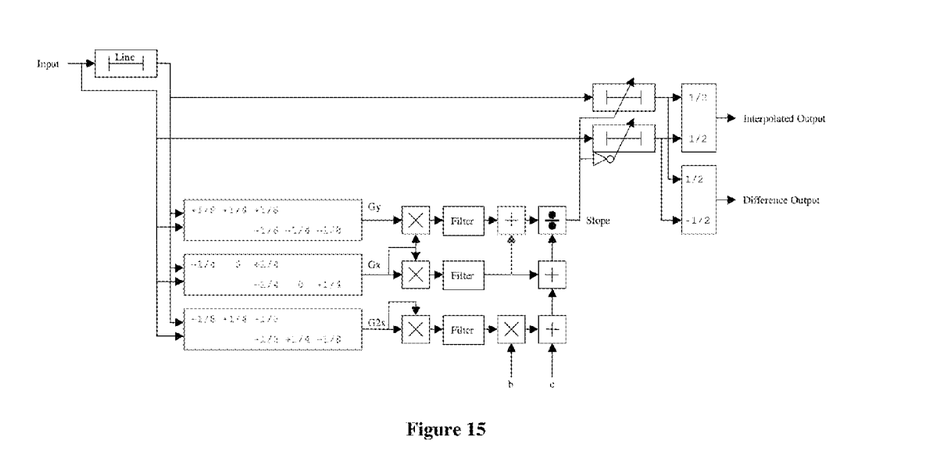
FIG. 15 is an interpolator which is pre-compensated for defined slopes.
Figure 16:
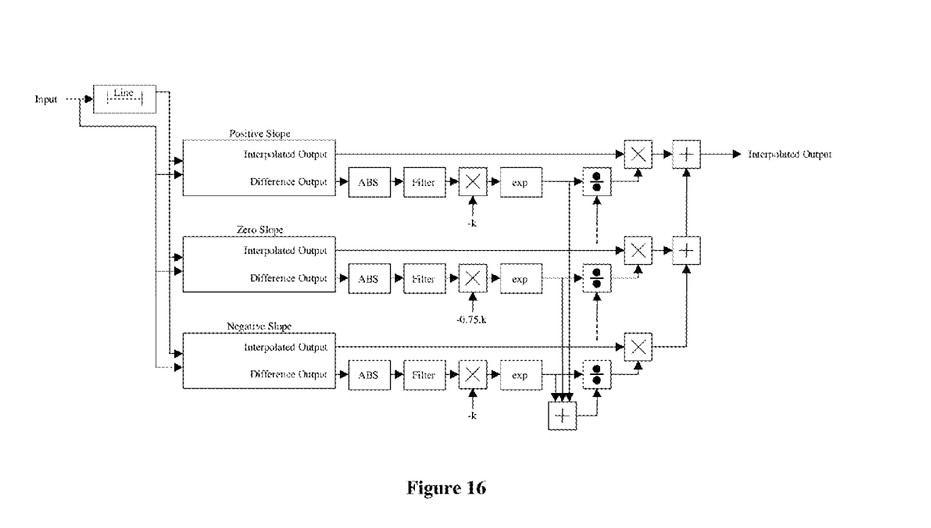
FIG. 16 is an interpolator which utilises adaptation between slope measurements.

The additional adder shown in the path of Gy in FIG. 15 has the effect of adding 1 to the slope value to compensate for the fact that the "twisted" filter shown in FIG. 15 has an inherent slope value of 1. This effect could also be achieved simply by adding 1 to the slope determined by the filter of FIG. 15. This twisted slope estimator is likely to produce a more reliable estimate for large positive slopes. Likewise, an opposite twist will produce a more reliable estimate for large negative slopes. A complete system could use three slope estimates, one with positive twist, one with negative twist and one with no twist. It remains to select or adapt between the three slope estimates. One possible way to achieve this is shown in FIG. 16:

Each slope estimator and associated interpolator produces an interpolated output and a difference output. The final output is a weighted sum of the three interpolated outputs. The weighting given to each output is proportional to the negative exponential of the magnitude of the corresponding difference value. In this example, the zero-slope (non-twisted) difference output is reduced relative to the others so that this estimator's result is favoured in the final mix.

This adaptation architecture is very flexible. For example, more extremely twisted slope estimators could be used, either alone or in twisted interpolators in combination with one or more of the exemplary interpolators described herein. A horizontal twist or offset of between 2 and 5 pixels has been found useful. Other interpolation methods, for example motion compensated spatio-temporal methods, could also be included within the adaption architecture, as long as they provide an interpolated output and a difference or error output.

The above description has assumed that the samples used in slope estimation are the same as those used for interpolation. It is also possible to use a first set of input samples, for example luminance samples, for slope estimation, and to use the estimated slope to control interpolation of a second set of samples, for example colour difference samples.

Any feature in one aspect of the invention may be applied to other aspects of the invention, in any appropriate combination. In particular, method aspects may be applied to apparatus aspects, and vice versa.

The specific filter values set out herein are intended to be merely exemplary and other filter values and ratios may be used as considered appropriate to a skilled person. In particular, the filter values of each filter shown herein sum to unity, but this is not necessary as will be appreciated by a skilled person.

The embodiments described herein are intended to be merely exemplary and variations and modifications may be made thereto within the scope of the appended claims.

The invention claimed is:

1. A spatial interpolator comprising:
an input adapted to receive a plurality of input pixel values;
one or more filters for deriving horizontal (Gx) and vertical (Gy) picture gradients from said input pixels;
a first multiplier for multiplying said horizontal (Gx) picture gradient by said vertical (Gy) picture gradient to form a first product (Gy·Gx);
a first smoothing filter operating on said first product (Gy·Gx) to form Filtered(Gy·Gx);
a second multiplier for multiplying said horizontal (Gx) picture gradient by itself to form a second product (Gx·Gx);
a second smoothing filter operating on said second product (Gx·Gx) to form Filtered(Gx·Gx);
a processor for deriving a slope measurement associated with the input pixels from said picture gradients according to:

slope=Filtered($Gy·Gx$)/Filtered $Gx·Gx$); and a processor for generating an interpolated output in which interpolated values are dependent upon the slope measurement of the slope associated with said array.

2. A spatial interpolator as claimed in claim 1 further comprising: a vertical filter for deriving a vertical interpolation value from said input pixels, and a processor for producing a correction value dependent on said slope measurement, wherein the interpolated output is a combination of the vertical interpolation and the correction value.

3. A spatial interpolator as claimed in claim 1 comprising one or more filters for deriving a measure of spatial activity of said input pixels, the slope measurement being dependent on said measure of spatial picture activity.

\* \* \* \* \*